United States Patent [19]

Yamada et al.

[11] Patent Number: 5,033,099

[45] Date of Patent: Jul. 16, 1991

[54] IMAGE RECOGNITION SYSTEM

[75] Inventors: Hiromitsu Yamada; Kazuhiko Yamamoto; Taiichi Saito, all of Ibaraki, Japan

[73] Assignee: Agency of Industrial Science and Technology, Tokyo, Japan

[21] Appl. No.: 559,588

[22] Filed: Jul. 30, 1990

[30] Foreign Application Priority Data

Jul. 31, 1989 [JP]  Japan ................................. 1-198853

[51] Int. Cl.$^5$ ............................................. G06K 9/48
[52] U.S. Cl. ................................................... 382/21
[58] Field of Search ................................... 382/21, 22

[56] References Cited

U.S. PATENT DOCUMENTS

| | | | |
|---|---|---|---|
| 4,783,829 | 11/1988 | Miyakawa et al. | 382/22 |
| 4,807,298 | 2/1989 | Conte et al. | 382/21 |
| 4,833,721 | 5/1989 | Okutomi et al. | 382/21 |
| 4,878,249 | 10/1989 | Mifune et al. | 382/21 |
| 4,926,492 | 5/1990 | Tanaka et al. | 382/21 |
| 4,959,870 | 9/1990 | Tachikawa | 382/21 |

*Primary Examiner*—Stephen Brinich
*Attorney, Agent, or Firm*—Spencer & Frank

[57] ABSTRACT

A model for a previously defined form is provided in terms of directional features for particular evaluation points and shift vectors from one evaluation point to the next. An input image is represented by density gradients for different directional planes. Shift operations for a counter plane which is used to accumulate values for evaluating the similarity between the image and the model, and add operations in which values from input directional planes as specified by the model are added to the counter plane, are performed repeatedly by parallel processing to find the total match with the model for the form.

10 Claims, 8 Drawing Sheets

IMAGE RECOGNITION SYSTEM

BACKGROUND OF THE INVENTION

1. Field of the Invention

The present invention relates to an image recognition system, and more particularly to an image recognition apparatus and method which recognize characters, identify the types and positions of objects, and so on, by extracting a previously defined "form" or "shape" from an input image.

2. Description of the Prior Art

One of the problems that have occurred so far when any automatic image recognition processing system is implemented on a computer or microprocessor is the large number of computations or logical and/or arithmetic operations to be performed for that processing. When image information is to be processed, it usually contains a great number of dots to be processed. A general-purpose processor that processes such image information in a sequential manner may be used for this purpose, but it would require a large amount of time for that processor to perform even a simple sequence of operations.

There is one approach that addresses the problem. This approach involves a dedicated image processing system that provides parallel processing functions for allowing every dot in the image information to be processed concurrently in a consistent manner.

It should be understood that the term "parallel processing" as referred to herein does not always mean a concurrent processing scheme for every dot in the image, but may mean a pipelined processing scheme that performs the same operations. In this parallel processing system, the operations on every dot in the image have priority over other procedures, and its control structure is specialized or simplified to enhance the processing efficiency. A dedicated image processor implements this conceptual architecture.

A dedicated image processing system has the following restrictions. When one dot in the image is currently being processed, any other dot that is adjacent to that dot must be processed independently of that dot. The image processing that occurs under those restrictions is called "local parallel processing".

In the local parallel processing system, its most primitive operations for the image include "erosion" and "dilation". In the "erosion" operation, a logical "AND" operation is performed for a given dot in a set of binary image information and any peripheral (neighbor) dot that is located adjacent to that dot. The output of the AND operation provides a new value for that dot. Suppose that there is a binary image that contains a view or picture, represented by a binary "1", and a background, represented by a binary "0". If then those logical operations are applied to the whole binary image, they will provide a view from which the peripheral areas have been removed. This is called the "erosion" operation. For the "dilation" operation, the logical "OR" operation is performed for the particular dot and any other adjacent dots. This provides an enlarged peripheral area in the view or picture. When a sequence of the "erosion" and "dilation" operations is performed, the first "erosion" operation will remove any fine dots or lines in the image information, followed by the subsequent "dilation" operation that will restore any large clusters nearly to their original states. The result is that only the "erosion" and "dilation" sequence may be performed on the local parallel processing system, in order to identify any clusters and the dots or lines in the image information and thereby to recognize them. This sequence expands the usual logical operation to the two-dimentional neighbors, which is one of the features of the dedicated image processor.

Another feature of the parallel processing scheme is the ability to process each dot and provide the corresponding result, independently of the other dots. Each individual result is consistent and highly reliable. For sequential image processing, when an image is processed to obtain some features, and if an error occurs for a dot during the processing, the error might affect the results for all dots including that dot. For parallel image processing, however, every dot is processed independently of the other dots so that, if an error occurs for a dot, that error will only affect the result for that dot, rather than the results for all dots. In this sense, parallel image processing can provide the image features with reliability.

Although the features of the parallel image processing scheme have been described as above, this scheme has restrictions on what it can process. It has been found that when the "erosion" and "dilation" operations are performed on a set of image information during parallel processing, it is impossible to distinguish the dots from the lines and recognize them as such. More specifically, during the "erosion" and "dilation" sequence, the dots as well as the lines, will be erased when the first "erosion" is performed.

For example, suppose that only the line features are to be extracted from a set of image information. If this occurs, the prior art practice is that the dedicated image processor, which has been processing the image information, will have to pass its control over to an appropriate general-purpose processor, which will take over the subsequent processing tasks. It may be appreciated that the parallel processing functions can only be used partially when the total processing steps are performed. Thus, the data and the procedures used to process the dots will have to be transferred between the dedicated image processor and the general-purpose processor. This will cancel the functions that are provided by the high-speed dedicated image processor. In order to make full use of those functions of the dedicated image processor, the parallel processing operations that may be performed on the dedicated image processor must be increased to meet its enhanced processing power requirements.

From this respect, the inventors of the present invention have developed an extended version of the "erosion" and "dilation" operations, which is called the "MAP" (Multi-angled Parallelism) technique (for additional information, refer to the publications "Directional Feature Field and Paralleled Operations for Binary Images: Twisting Operation for Arbitrarily Directional Propagation by 8-Neighbors", by Hiromitsu Yamada and Kazuhiko Yamamoto, Trans. IEICE Japan, Vol. J72-DII,, No. 5, Pages 678–685, May 1989, and "Feature Extraction from Topographical maps by Directional Local Parallel Operations for Binary Images", by Shinji Matsui, Hiromitsu Yamada, Taiichi Saito, Shigeru Muraki and Kazuhiko Yamamoto, Technical Report of IEICE Japan, Vol. PRU88-76, Nov. 1988).

For the prior art "erosion" and "dilation" operations, a new value is obtained from the information that represents a given dot and any other peripheral dots that surround that dot, and is updated to reflect the value for that dot. This processing occurs concurrently for all of the peripheral dots.

For MAP processing, each of the peripheral dots is not considered as being uniform. Rather, it employs the concept of a "directional plane" which is defined by a particular image information and which corresponds to a particular dot and each of its neighboring dots, and looks at each neighboring dot by using this concept. The logical and arithmetic operations are also performed for the direction of each dot. The extensions provided by the MAP technique allow the dots and the lines to be identified separately, whereas the prior art technique can only distinguish large clusters from the small dots and fine lines. In addition, the MAP technique allows for use of parallel image processing operations as a means of extracting wider-range geometrical features from the image information.

It may be appreciated that both the "erosion" and "dilation" operations, and the MAP operation, may basically apply to the processing of binary image information, but those operations may be extended to include the processing of multiple-value image information, by replacing the AND and OR operations with the MIN and MAX numerical operations, respectively.

The fact that the directional features may be extracted during the visual information processing steps is important, and this has already been verified by discoveries of the relevant facts in the visual physiology field, as well as by experimental attempts to analyze those facts in the character recognition and various image recognition schemes. The development of the MAP technique has made it possible for parallel processing to be used to extract such "lines", i.e., those features processing the directions possible.

Here, again, when parallel processing that provides high-speed functions, as described above, is considered from the aspect of the extended processing contents, demands occur for the higher-order features to be extracted. The possible higher-order features may include "forms" or "shapes" that may be represented as a set of lines. If the features of each respective line, and any arbitrary "form" or "shape" defined as the relationship between those lines, can be extracted from a particular input image, a mechanism that allows any higher-order features to be extracted may be implemented.

When this is viewed in a different way, a technique for extracting such "forms" or "shapes" may become a technique for recognizing objects. Specifically, for optical character recognition, recognition of the types and locations of objects as viewed by robots, recognition of biological organisms and internal organs in medical images, and so on, the problem of extracting any previously defined "forms" or "shapes" from the particular input image information is the principal problem to be solved. At present, the existing technique for extracting such "forms" or "shapes" may be said to encompass an "image recognition" technique implemented by a machine.

SUMMARY OF THE INVENTION

The object of the present invention is to provide an image recognition apparatus and method, wherein and whereby any particular form previously defined as a set of lines (which hereinafter will be referred to as a "model") may be overlapped with any particular input image information having features which are expressed in different directional planes, thereby allowing parallel processing to be used to extract that "form" of the model from the particular input image information with high speed and with high reliability.

These and other objects which will become apparent in the ensuing detailed description can be attained by establishing a directional framework which is used both when the model is prepared and during preliminary processing of the image information. The directional framework may be eight directions radiating from a given point at equal angular intervals. The model may be prepared by selecting evaluation points on the periphery of the form, storing shift vectors indicating the direction and distance from one evaluation point to the next, and storing for each evaluation point information to identify which of the eight directions most closely matches the direction of a normal line which passes through the relevant evaluation point. During preliminary processing of the image information, edge operators are used to find the rate of change in the image density in the different directions. The information extracted from the image by the edge operators is used to generate a directional plane for each of the directions. A counter plane having a mesh of counter positions for accumulating values is then shifted with respect to the directional planes along a path specified by the shift vectors of the model and, at each shift, values in the directional plane specified by the model for the relevant evaluation point are added to the counter positions of the counter plane. The shifting and adding can be accomplished by parallel processing. After all the shifts and additions have been completed, the counter plane is examined for relative maxima to determine the positions of any forms that may have appeared in the original image information.

In accordance with a first aspect of the present invention, an image recognition apparatus for recognizing an image by extracting a previously defined form from an input image composed of a plurality of image points each of which has image information, and to which predetermined multiple directions are assigned, comprises model storing means for storing a model of said form, said model being expressed in terms of a sequence consisting of evaluation points defined on said form, each of said evaluation points having a value for a directional feature determined for the respective evaluation point and having a shift vector to said respective evaluation point from an evaluation point immediately preceding said respective evaluation point in said sequence;

directional plane generator means for generating a plurality of directional planes, each directional plane corresponding to a respective one of said multiple directions and including a plurality of directional plane points, each directional plane point corresponding to a respective one of said image points and having a respective directional intensity value which represents the change in the density of said input image in the one of said multiple directions that corresponds to the directional plane to which the respective directional plane point belongs;

directional plane storing means for storing said directional planes generated by said directional plane generator means;

counter plane storing means for storing a counter plane which includes a plurality of counter plane points each of which corresponds to a respective one of said image points, said counter plane points having counter values each of which represents a degree of similarity in form between said input image and said model;

shift means for shifting said counter plane stored in said counter plane storing means according to said shift vector defined for each evaluation point;

add means for adding, to said counter plane values of said counter plane shifted by said shift means, the directional intensity values of a directional plane determined by the value for the directional feature defined for the relevant evaluation point with regard to the shifting operation by said shift means;

control means for performing the shift operation by said shift means and the add operation by said add means repeatedly in the order of said evaluation points in said sequence; and detect means for determining the location of said form from the distribution of said counter values for said counter plane points of said counter plane storing means, after said shift operation and said add operation have been performed repeatedly.

In accordance with a second aspect of the present invention, an image recognition method for recognizing an image by extracting a previously defined form from an input image composed of a plurality of image points each of which has image information, and to which predetermined multiple directions are assigned, comprises the steps of:

storing a model of said form, said model being expressed in terms of a sequence consisting of evaluation points defined on said form, each of said evaluation points having a value for a directional feature determined for the respective evaluation point and having a shift vector to said respective evaluation point from an evaluation point immediately preceding said respective evaluation point in said sequence;

generating directional planes, each directional plane corresponding to a respective one of said multiple directions and including a plurality of directional plane points, each directional plane point corresponding to a respective one of said image points and having a respective directional intensity value which represents the change in the density of said input image in the one of said multiple directions that corresponds to the directional plane to which the respective directional plane point belongs;

storing said directional planes;

storing a counter plane which includes a plurality of counter plane points each of which corresponds to a respective one of said image points, said counter plane points having counter values each of which represents a degree of similarity in form between said input image and said model;

shifting said stored counter plane according to said shift vector defined for each evaluation point;

adding to said counter plane values of said counter plane shifted by said shift means, the directional intensity values of a directional plane determined by the value for the directional feature defined for the relevant evaluation point with regard to the shifting operation by said shift means;

performing the shift operation and the add operation repeatedly in the order of said evaluation points in said sequence; and determining the location of said form from the distribution of said counter values for said stored counter plane points, after said shift operation and said add operation have been performed repeatedly.

The apparatus and method according to the present invention may have a wide range of automatic image recognition applications, including recognition of characters appearing on the complex background, identification of the types and locations of objects as viewed by a robot, recognition of various biological organisms and internal organs in medical image information, and the like.

The above and other objects, effects, features and advantages of the present invention will become more apparent from the following description of embodiments thereof taken in conjunction with the accompanying drawings.

DETAILED DESCRIPTION OF PREFERRED EMBODIMENTS

First, directional planes, a model and a counter plane, which are the major concepts of the present invention, will be described.

DIRECTIONAL PLANES

Figure 1:
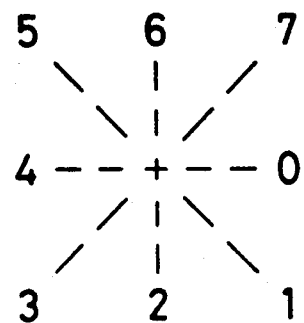
FIG. 1 is a diagram illustrating the directions of a directional plane as defined in the embodiment of the present invention.
Figures 2A, 2B:
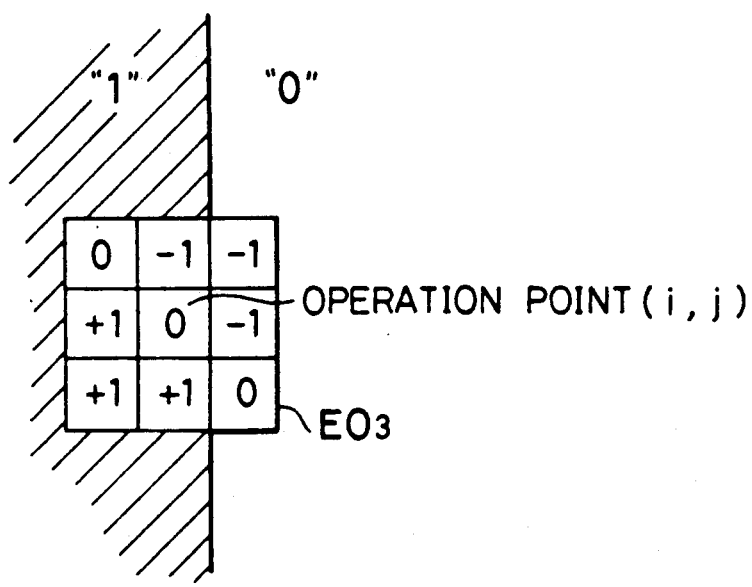
FIG. 2A is an explanatory diagram illustrating the edge operators according to the embodiment of the present invention.
FIG. 2B is an explanatory diagram for explaining the operation of the edge operators in FIG. 2A.

N directional characteristic elements, which are calculated from the gradient of the image density in N directions from each point of an input image, are called directional planes. In the present embodiment, 8 directional planes are calculated in the 8 directions shown in FIG. 1, respectively. Accordingly, the total 8 directional planes U of an input image can be expressed as follows:

$$U = \{u_n(i,j)\}, n = 0, 1, \ldots, 7 \quad (1)$$

$$1 \leq i \leq I$$

$$1 \leq j \leq J$$

where $u_n(i,j)$ represents a directional plane in the direction of n shown in FIG. 1 at the point (i,j) on the input image, which is divided into meshes of I×J. The directional plane $u_n(i,j)$ is determined with respect to the point (i, j) and its neighbors and the direction n, and indicates the directional intensity in the direction n at the point (i,j) on the input image. In actual operation, edge operators $EO_0$-$EO_7$ are used. The directional plane $u_n(i,j)$ is obtained as the output of a respective one of the edge operators $EO_0$-$EO_7$, which are set corresponding to the 8 directions. The operative concept of the edge operators $EO_0$-$EO_7$, is shown in FIG. 2A. The edge operators $EO_0$-$EO_7$ are used to perform operations at an operation point and its 8 neighbors by using the values set with respect to the directions to which the respective edge operators $EO_0$-$EO_7$ correspond, thereby producing the directional intensity of the image information at the operation point.

For example, assume that a line showing the contour of the input image information is in a vertical direction (the direction indicated by 2 and 6 in FIG. 1), that the points at the left hand side of the line are all "1" (black) and the points at the right hand side are all "0" (white), and that the arithmetic is performed onto an operation point (i,j) of value "1" in FIG. 2B at the immediate left side of the line. The arithmetic of edge operator $EO_3$ (which corresponds to the direction n=3), for example, is performed as shown in FIG. 2B. First, the center of the edge operator $EO_3$ is positioned on the operation point (i,j). Second, a multiplication-and-addition operation between the respective values of the edge operator $EO_3$ and the image information ("1" or "0") of the arithmetic point (i,j) and its 8 neighbors, that is, $0\times"1"+(-1)\times"1"+(-1)\times"0"+1\times"1"+0\times"1"+(-1)\times"0"+1\times"1"+1\times"1"+0\times"0"=+2$, is performed, thereby to obtain $u_3(i,j)=2$. Operations using the other edge operators in FIG. 2A are also performed with regard to the operation point (i,j). If the resultant value of an operation is negative, the value is set to 0. Thus, 8 directional planes are obtained. In the above example, $u_0(i,j)=u_1(i,j)=u_2(i,j)=u_6(i,j)=u_7(i,j)=0$; $u_3(i,j)=u_5(i,j)=2$; and $u_4(i,j)=3$. These outputs from the edge operators indicate the grandients of the density of the image at the operation point (i,j) on the input image. The direction of the gradient is defined as that of the gradient from the lower to the higher density.

The outputs of the edge operators $EO_0$-$EO_7$, whose directional characteristics are local, do not have tight directional accuracy. Hence, the outputs may be substituted with characteristic elements which are obtained by incorporating into the outputs information perpendicular to the direction of the gradient, and which indicate linear components in the neighbors. These characteristic elements will be better for the subsequent processings. The incorporation processing described above can be carried out by repeating the local parallel operation using the aforesaid MAP method proposed by the inventors of the present invention. For example, the output of the edge operator $EO_3$ can be calculated as follows: First, the outputs of the edge operator $EO_3$ are calculated when the center of thereof is shifted to the upper left and the lower right points of the operation point (i,j) in FIG. 2B (that is, in the direction perpendicular to the direction n=3); second, the minimum is found between the results obtained at the first step and the result obtained about the operation point (i,j), which is 0 in this case, and this value is defined as the outout of the edge operator $EO_3$. In this way, the outputs of the edge operators can express the direction of the actual contour more accurately. The form of expression and the meaning of the characteristic elements, however, are the same before and after the incorporation processing, and hence the directional planes $u_n(i,j)$ in the description below are assumed to be the outputs of the edge operators $EO_0$-$EO_7$ shown in FIG. 2A. As described above, each of the points defined by a mesh on the input image produces 8 directional characteristics (i.e., directional planes), which are handled as the input information hereafter. Accordingly, the directional planes may be also called input planes. Incidentally, the points of the input image may be pixels of an image acquired by an image input device such as a television camera.

Figure 3:
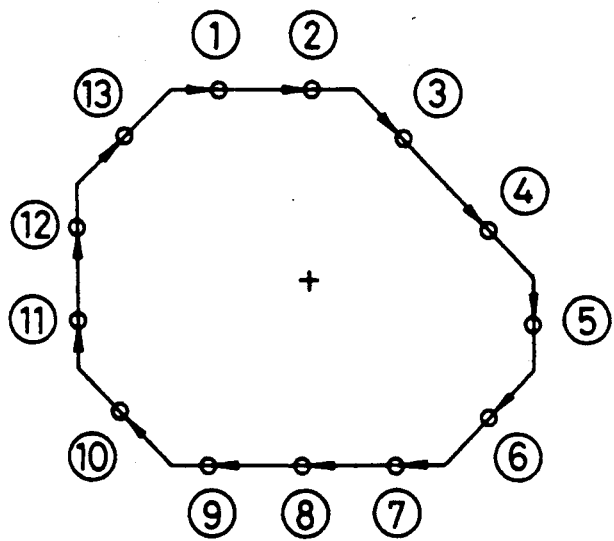
FIG. 3 is a schematic diagram showing a typical model according to the embodiment of the present invention.

MODEL (see FIG. 3)

A model indicates a form to be abstracted from the input image. It is defined by two features: The direction of the normal line at each point of M (=13 in the example of FIG. 3) evaluation points taken along the contour of the form (the direction is discretely expressed by one of the 8 direction shown in FIG. 1); and shift vectors to each evaluation point from the proceeding evaluation point thereof. The two features, that is, the directions of the normal lines and the shift vectors, are called attributes of the model evaluation points. A model R is expressed as follows.

$$R = \{(r_m, p_m, q_m)|m = 1, 2, \ldots, M\} \quad (2)$$

$$0 \leq r_m \leq 7$$

where $r_m$ indicates the direction of the normal line at the m-th evaluation point, which is designated by one of the numbers 0–7 shown in FIG. 1. In the model shown in FIG. 3, the inside of the contour is of a low density, and the background (outside of the contour) is of a high density. As a result, the direction $r_m$ is toward the outside of the contour and is represented by one of the 8 discrete values shown in FIG. 1. The evaluation points are preferably taken on such portions of the contour where the curves are mild and hence there is little change in the normal directions. This is because the directions $r_m$ are to be compared with the directional characteristics obtained from an input image.

The shift vector $(p_m, q_m)$ in the equation (2) represents the direction and amount of the shift from the (m−1)-th evaluation point to the m-th evaluation point. Likewise, the vector $(p_1, q_1)$ represents the shift direction and shift amount from the M-th evaluation point to the first evaluation point.

The M-th evaluation point is called the reference point. The total shift vector from the reference point to the m-th evaluation point is given by the following equation.

$$(\Sigma p_m, \Sigma q_m) = \left(\sum_{m'=1}^{m} p_{m'}, \sum_{m'=1}^{m} q_{m'}\right) \quad (3)$$

The model R is prepared before the processing of input image information, and is stored in the processing system as knowledge. The method of producing the model is as follows: First, entering the form to be extracted as a model; second, determining the evaluation points by using, for example, one of the following methods.

(a) An operator designates the locations of the evaluation points.

(b) The processing system automatically determines (for example, at a fixed interval) the evaluation points on the contour, and the normal directions at the respective evaluation points.

(c) The processing system makes all the points on the contour evaluation points, and determines the normal direction at each point (in this case, $-1$ (mesh unit)$\leq p_m$, $q_m \leq 1$(mesh unit)).

In any case, the model information must be defined in the processing system before the processing of an input image. Incidentally, when the direction of the normal line at each evaluation point differs from the 8 directions shown in FIG. 1, the nearest direction is selected as the direction $r_m$.

COUNTER PLANE

Next, the counter plane, which is a storing means for storing the intermediate results of the processing, will be described. Here, the number of meshes of the counter plane is assumed to be equal to that of the input image. The counter plane has an evaluation value $c(i,j)$ for each point $(i,j)$ on the input image. The evaluation value $c(i,j)$ is the total sum of the values obtained by performing a predetermined calculation described below when the counter plane is moved on the input image along the evaluation points of the model R. The evaluation values $c(i,j)$ thus obtained represent the similarity between the model R and the input image when the reference point of the model R is positioned on the point $(i,j)$ of the input image. Here, the counter plane is represented by C, and $C[p_m,q_m]$ denotes the counter plane obtained by shifting (parallel movement) the plane C according to the vector $(p_m,q_m)$.

The object of the processing according to the present invention is to extract the form specified by the model from the input image information by a parallel algorithm. The form has the directional characteristics and the positional relationship designated by the evaluation points of the model. This processing will now be described.

(1) INITIAL SETTING (FIG. 4A)

Figure 4A:
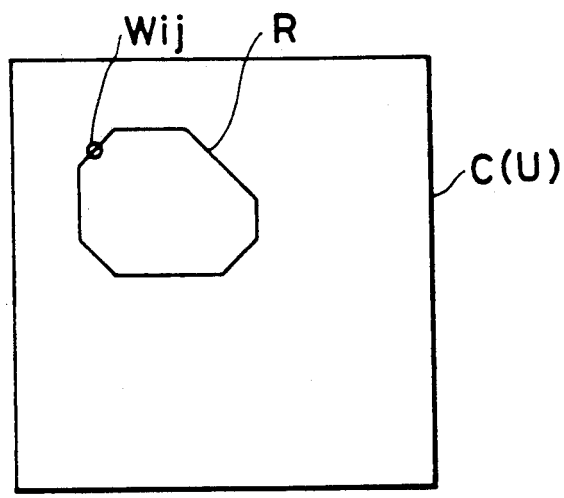
FIGS. 4A–4C are explanatory diagrams for explaining the "shift" operation of a counter plane and the "add" operation of an input plane in the embodiment of the present invention.

After clearing the counter plane C, it is superimposed on the input plane U and a point $(i,j)$ on the counter plane C is chosen. Changes of the counter value (evaluation value) $c(i,j)$ of the point $(i,j)$ are traced when the counter plane C is moved along the evaluation points of the model; such point is called a window $W_{ij}$ hereafter. The counter value $c(i,j)$ of the window $W_{ij}$ is designated by $w_{ij}$. In the initial condition, the window $W_{ij}$ is positioned on the point $(i,j)$ of the input image. FIG. 4A shows the location of the counter plane C with regard to the input plane U, and shows that the window $W_{ij}$ virtually assumes the position of the reference point of the model R.

(2) Two types of processings below are sequentially performed with regard to the evaluation points of the model $m=1, 2, \ldots M$.

Figure 4B:
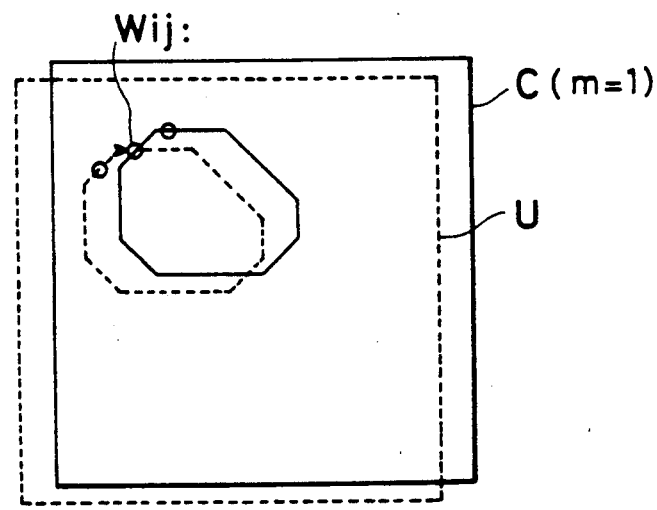
Figure 4C:
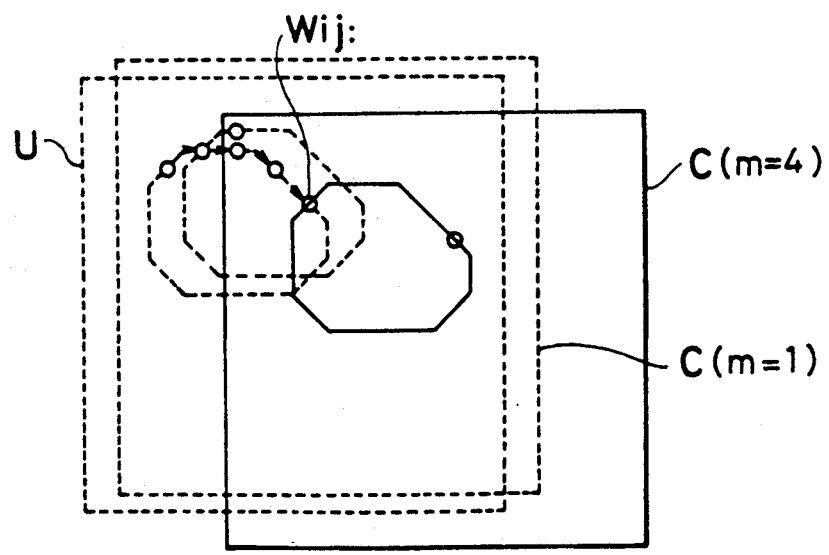

(2-1) PARALLEL SHIFT (see FIGS. 4A–4C)

The counter plane C is shifted in parallel by vector $(p_m, q_m)$. This process is expressed by the following equation.

$$C := C[p_m, q_m] \tag{4}$$

Here, the symbol := means that the value of the left-hand side of the equation is substituted by the value calculated according to the right-hand side of the equation.

The parallel shift processing is uniformly and independently performed with regard to each point $(i,j)$ of the counter plane C, and hence, it can be quickly performed by parallel processing.

As a result, the window $W_{ij}$ moves from the initial position to the location $(i+\Sigma p_m, j+\Sigma q_m)$ on the input image (the directional plane U). For example, FIG. 4B shows the window position when $m=1$, in which the window $W_{ij}$ moves to the evaluation point of $m=1$ of the model R shown by the dotted line.

(2-2) ADDITION

When a new counter plane C is obtained by a parallel shift, one directional plane $U_{rm}$ selected from the 8 directional planes U on the basis of the directional number $r_m$ is added to the counter plane C. This is expressed by the following equation.

$$C := C + U_{rm} \tag{5}$$

The addition is also performed uniformly and independently with regard to each point on the counter plane C and the directional plane $U_{rm}$, and hence, it can be performed at a high speed by parallel processing.

By the processing of equations (4) and (5), the value $w_{ij}$ of the window $W_{ij}$ is updated by the following equation.

$$w_{ij} := w_{ij} + u_{rm}(i+\Sigma p_m, j+\Sigma q_m) \tag{6}$$

The parallel shift of equation (4) and the addition of equation (5), as clearly seen from equation (6) and FIG. 4B, are conducted in such a manner that the counter plane C represented by solid lines and the input plane U represented by dotted lines are added in their own positions. That is, it should be noted that the position designated by the suffix ij of $W_{ij}$ does not indicate the current position but the initial position on the counter plane C illustrated by FIG. 4A.

FIG. 4C shows the location of the counter plane C when the addition is performed for the evaluation point of $m=4$. The current position of the window $W_{ij}$ corresponds to the evaluation point of $m=4$ of the model R which is assumed on the input plane U at the initial setting shown in FIG. 4A. The location of the input plane U at this time does not change as shown by the dotted lines.

The window $W_{ij}$ returns to its starting place $(i, j)$ after M repetitions of parallel shifts in accordance with procedure (2-1) and additions in accordance with procedure (2-2). This is clearly seen from the equations $i+\Sigma p_m = i$, $j+\Sigma q_m = j$, obtained by considering the manner of setting $(p_1, q_1)$. In other words, the last evaluation value $w_{ij} = c(i, j)$ of the final window $W_{ij}$ includes the total sum of the directional planes selected at respective evaluation points. The total sum is obtained by placing the reference point (M-th evaluation point) of the model on the point $(i, j)$ of the input image, and by adding the evaluation value (that is, the selected directional plane) at each of the M evaluation points along the contour of the model R. Since this processing is performed in parallel fashion with regard to all points $(i, j)$ on the input image, the total sum of the evaluation values are simultaneously obtained with regard to all the points $(i, j)$.

After that, a point of the input image that matches best to the model R is extracted: The point $(i, j)$ and the evaluation values $c(i, j)$ at which the input image matches best to the model R are determined by searching for the $\max\{c(i, j)\}$ which is the maximum total sum on the counter plane C when the model is assumed to be positioned on any of the areas of the input image.

When a plurality of image components having similar forms to that of the model are included in the input plane U, they can be extracted by searching for maximal points in addition to searching for a single maximum point.

Figure 5:
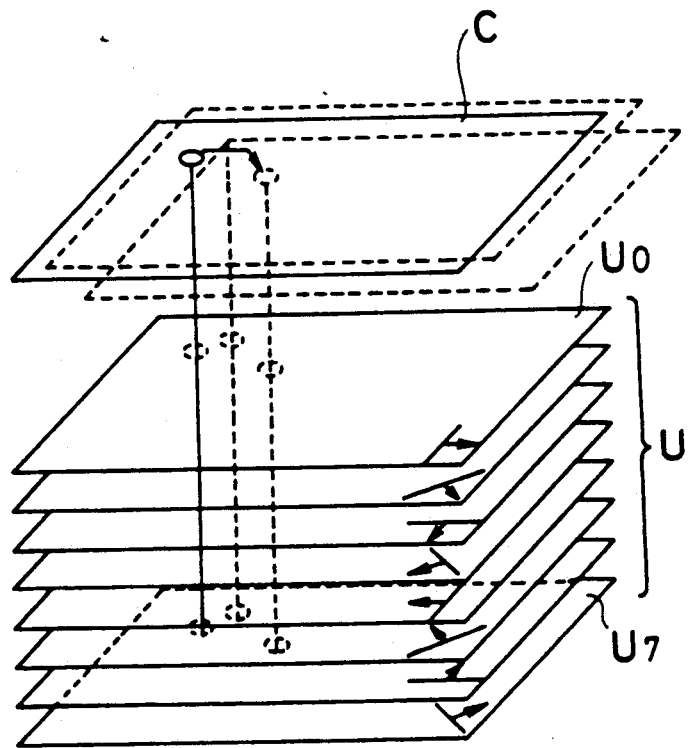
FIG. 5 is an explanatory diagram illustrating the "shift" operation of the counter plane and the "add" operation of the input plane in three dimensions.

FIG. 5 shows the above processing in a three-dimensional view. In FIG. 5, the top plane is the counter plane C, and 8 planes thereunder are the directional planes (input planes) U calculated from the input image information. Each of the 8 planes U includes the directional characteristics of the directions indicated in FIG. 5. Only counter plane C at the top shifts as shown in FIG. 5 in accordance with the processing. The shift shown in FIG. 5 corresponds to the shifts of FIG. 4A–4C. Values of the counter and directional planes are added through a vertical line which passes the window in FIG. 5 with respect to every evaluation point. In this case, it is not all the values of the 8 directional planes U, but only one value of one plane of the 8 directional planes U, which is selected for each evaluation point of the model, that is added to the value of the counter plane C.

Next, the arrangement and operation of an image recognition apparatus that carries out the above processing will be described with reference to FIGS. 6–9.

Figure 6:
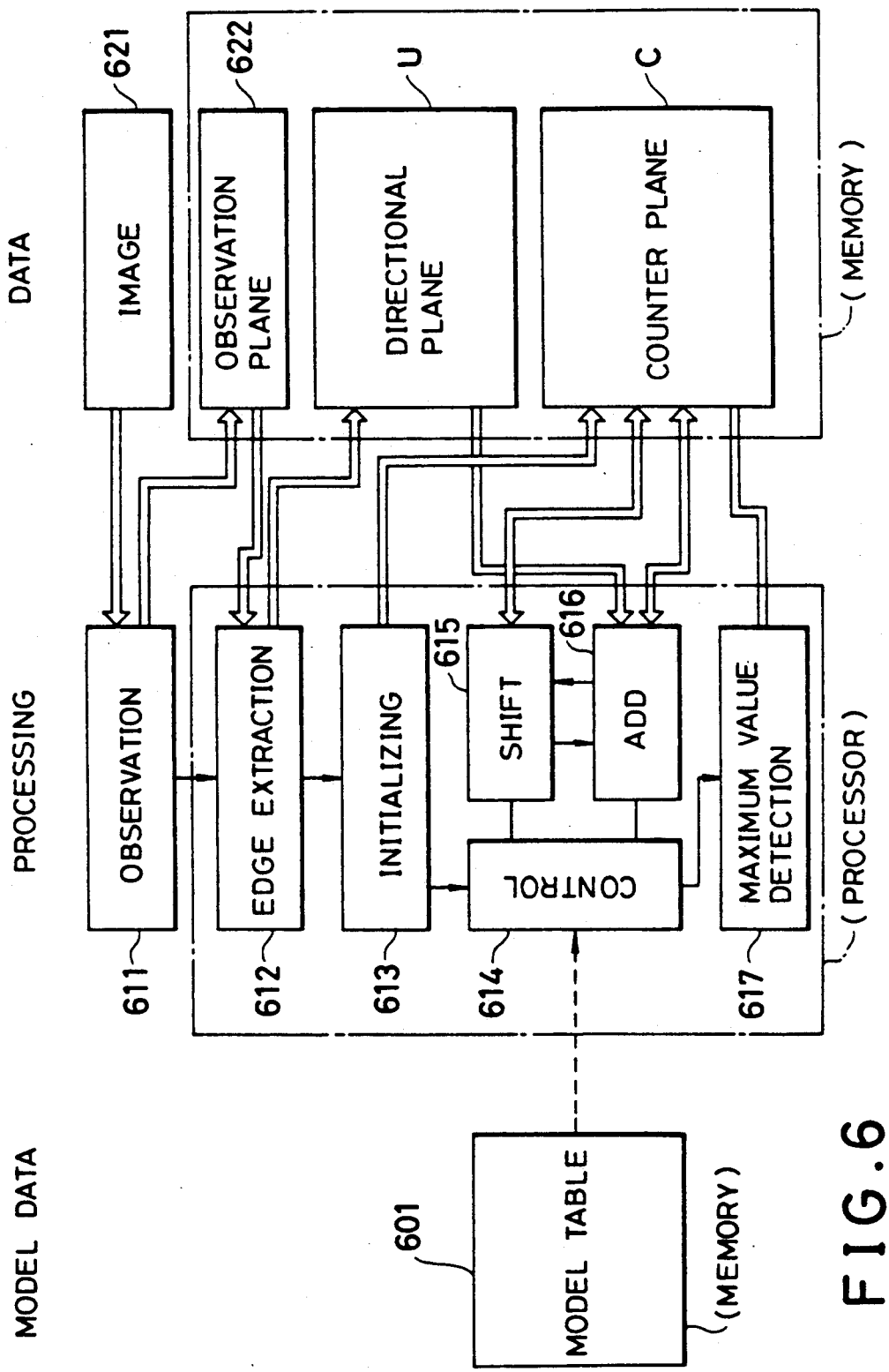
FIG. 6 is a block diagram showing an embodiment of an arrangement for the image recognition processing apparatus according to the present invention.

In FIG. 6, the central portion shows a processor that can be arranged with a CPU as a major component except for the observation portion 611. A part of the processor may be constructed by hardware for exclusive use. At the left-hand side of the processor is a memory for the model data, and at the right-hand side is a memory for the two dimensional data except for an image 621. These memories can be provided by a RAM or an external storage.

An image 621 drawn on a piece of paper or the like is read by the observation portion 611, having a television camera or the like, using photoelectric conversion, and is converted into digital data which are stored in an observation plane 622. Incidentally, the observation portion 611 is not limited to a television camera. Other optical detectors such as robot vision or the like can be used. Accordingly, objects to be recognized are not restricted to characters or images drawn on paper; other objects such as articles on production lines in a factory, various tissues in medical images, etc., can be used as the image 621 to be recognized.

Figure 8:
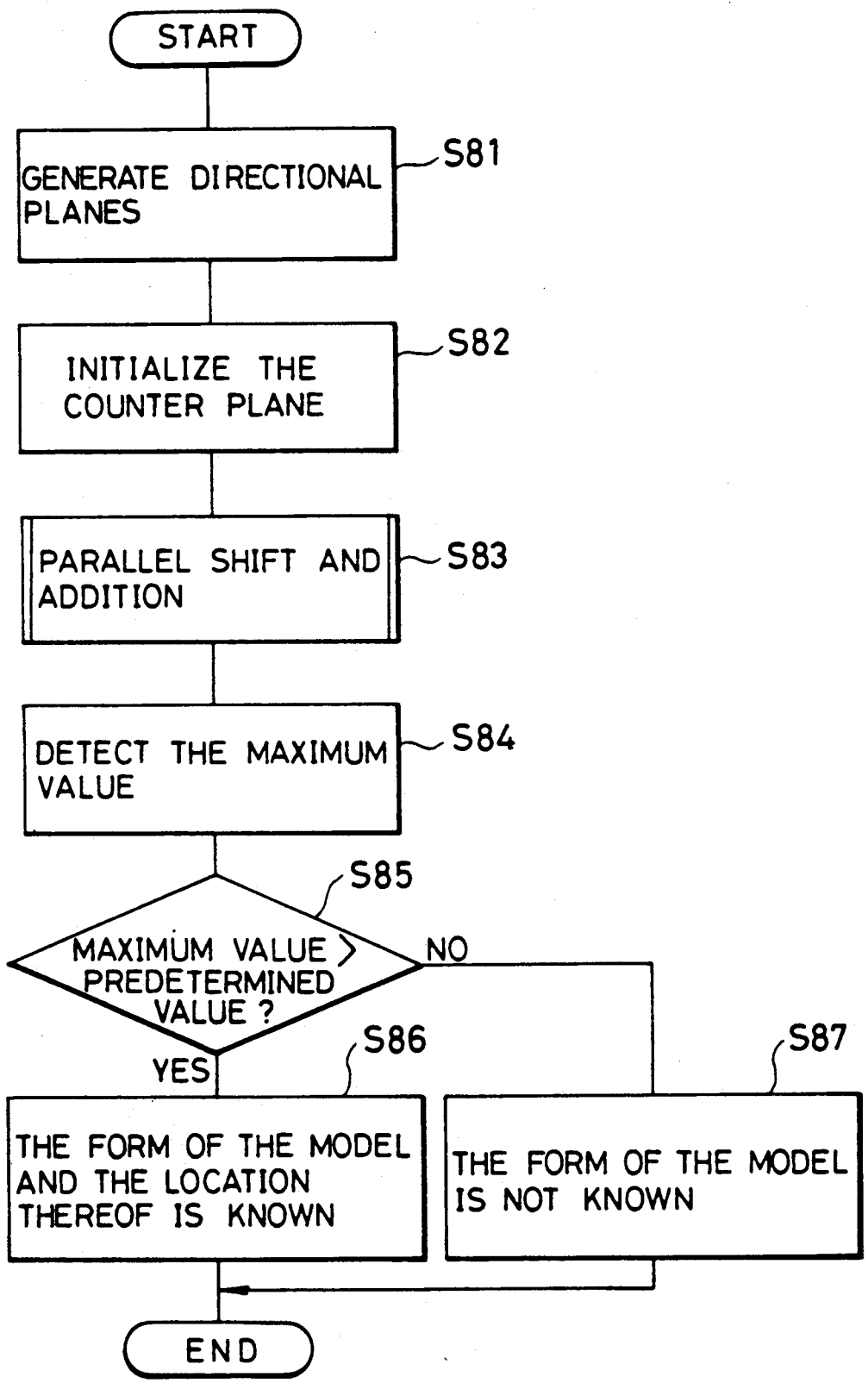
FIG. 8 is a flowchart illustrating an example of a procedure for the image recognition processing according to the embodiment of the present invention.

The image recognition processing of the input image stored in the observation plane 622 will now be described with reference to the flowchart shown in FIG. 8. When the processing is started, at step 81, 8 directional planes U ($U_0$–$U_7$) are generated from the input image information stored in the observation plane 622 by using the edge operators $EO_0$–$EO_7$ in an edge extraction portion 612. Before the processing, the directions of the normal and shift vectors for each of the M evaluation points are stored in a model table 601 in the form of a table as model information.

At the next step S82, an initializing portion 613 initializes the value $c(i, j)$ of each point on the counter plane C to zero. After that, at step S83, the parallel shift and the addition procedures are performed. A control portion 614 controls a shift portion 615 and an add portion 616 to sequentially carry out the shifts and additions beginning from m=1 and ending at m=13. More specifically, the shift portion 615 shifts in parallel the counter plane C by the amount designated by the shift vector of the model R. Since this is a uniform, independent processing with regard to all the points of the counter plane C, the processing can be performed in parallel at a high speed. The add portion 616 adds the directional plane Urm designated by the directional number rm of the model R to the counter plane C. The processing is also performed uniformly to and independently of all the points in the planes, and hence, the processing can be quickly carried out in parallel.

When M times shifts and additions are completed, a maximum value detection portion 617 detects the maximum value and the location thereof from the evaluation values (the counter values) of the points on the counter plane C at step S84. At step S85, the control portion 614 judges whether the detected maximum value is larger than a predetermined value or not. If the maximum value is greater than the predetermined value, the control portion 614 recognizes that a form identical or similar to that of the model R exists in the input image and knows the location of the form on the basis of the location of the maximum value, at step S86. That is, the location of the point (i, j) which has the maximum value coincides with the location of the reference point (the 13-th evaluation point) of the model R. The information thus obtained is transferred to a host system (not shown). On the other hand, if the maximum value is smaller than the predetermined value, the portion 614 informs the host system at step 87 that the form of the model has not been found. The processing is sequentially performed by successively reading out the contents of the counter plane C and comparing them. It is also possible to arrange this portion with hardware to make it faster.

Figure 7:
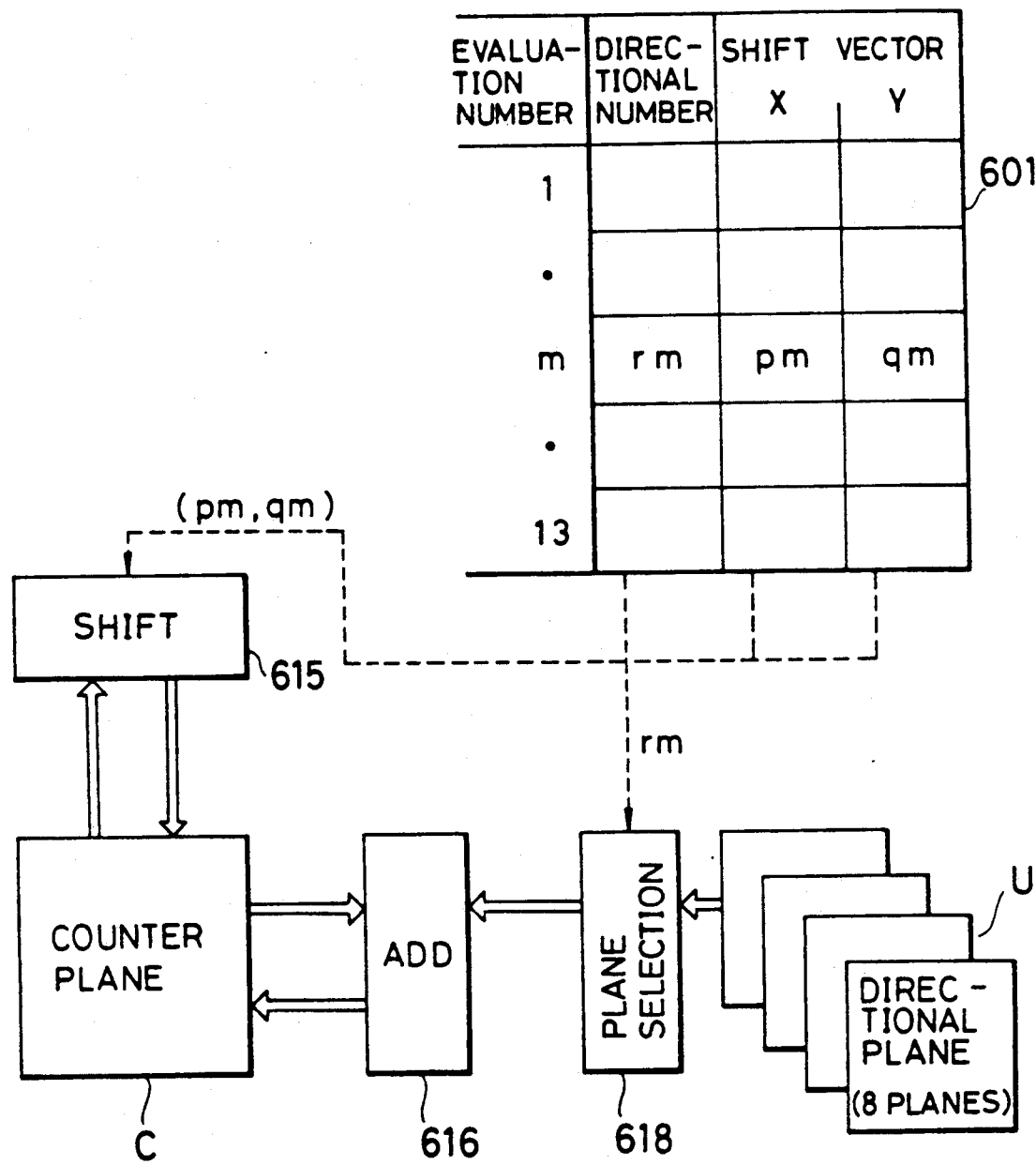
FIG. 7 is a block diagram showing the details of the "shift" and "add" operations in FIG. 6.
Figure 9:
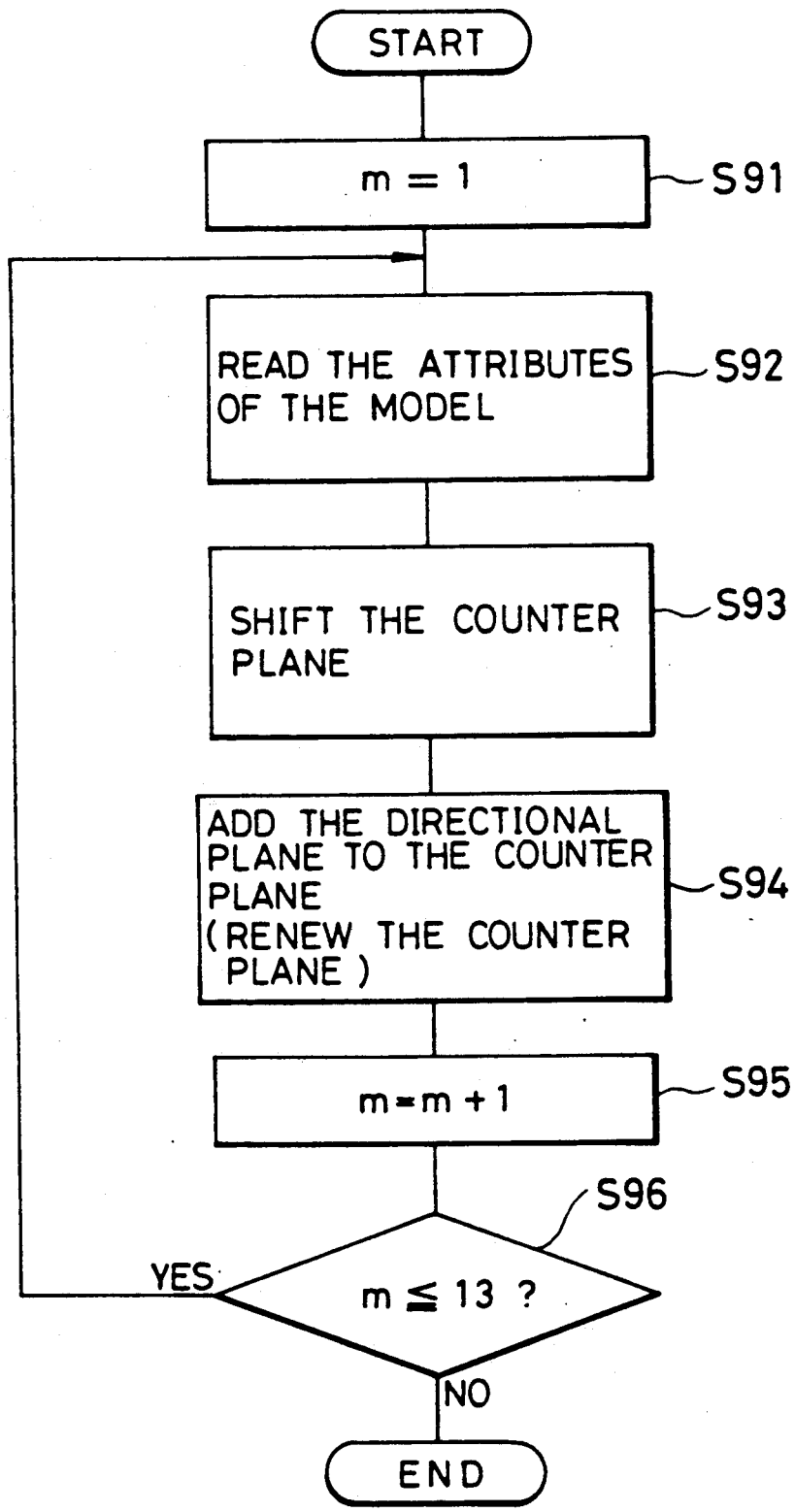
FIG. 9 is a flowchart illustrating an example of a procedure for the "shift" and "add" processings shown in FIG. 8.

The major process of the above procedure is step S83, the repetition of shifts and additions. FIG. 7 is a block diagram for explaining the the shift and add processing beginning from m=1 and ending at m=13, and FIG. 9 is a flowchart of the processing.

When the processing starts, evaluation point parameter m is initialized to m=1 at step S91. At step S92, the value ($r_1$, $p_1$, $q_1$) at the first line of the model table 601 is read out. At the next step S93, the shift portion 615 shifts in parallel the counter plane C by the read vector ($p_1$, $q_1$), and makes the shifted plane a new counter plane. The shift portion 615 shifts all the points on the counter plane C by the control information (pm, qm), and is independent with regard to each point on the plane. Thus, the shift processing can be uniformly and independently performed for all the points on the plane. This processing can be made faster by pipelining the memory access in a single processing circuit, or by using a complete parallel system in which a processing circuit is provided for each point.

Next, at step S94, the add portion 616 adds the directional plane selected by a plane selection portion 618 to the counter plane C to create a new counter plane C. In this case, the plane selection portion 618 selects the directional plane on the basis of the direction designated by $r_1$ read out from the table 601. Since the process, like the parallel shift processing, is independent with regard to each point of the plane, the processing can be quickly achieved by parallel operations. At the next step S95, the content of parameter m is incremented by 1, and at step S96, m is tested to judge whether it is smaller than 13 or not. If the result is positive, the processing returns to step S92. Thus, the above shift and addition processing can be sequentially carried out for m=1, 2, 3, ... 13.

In principle, a form given by a model image could be extracted from the input image by superimposing (by performing the inner product) the input image and the model image at all of the input points. Such template matching on the entire plane is not practical. This is because determining the inner product to the entire plane would require too many operations.

According to the embodiment of the present invention, the model is expressed as a chain of directional characteristic elements. Thus, the evaluation points of the model do not spread to the entire plane, but are limited to the characteristic elements. As a result, the number of operations can be reduced in comparison with template matching to the entire plane. Furthermore, quick calculation by the use of parallel processing can be achieved because the processing for the entire input image is by parallel shift and addition, which are very simple. Thus, matching on the entire plane can be realized in practice.

Another important feature of the present invention is that it uses directional characteristics. Introducing the directional characteristics makes it possible to achieve high accuracy matching. This is because the directional characteristics include information about the neighbors, and so the quality of the image recognition can be maintained even if the number of the evaluation points is reduced. Moreover, using the expression form of directional planes makes it unnecessary to calculate the distance concerning the similarity from the difference of angles and intensities, which is commonly used, and makes it possible to achieve similar quality of recognition by using only adding operations. This is the reason the calculation of the similarity can be carried out by parallel processing.

In addition to the above embodiment, the following variations and the various combinations thereof are possible.

(1) Slight movement of the input image can be absorbed by considering not only the points on the input planes U directly under the window but also the neighbors thereof. This is possible by shifting the input planes U during the addition processing. In this case, the equation (6) is replaced by the following equation.

$$w_{ij} = w_{ij} + \max_{-1 \leq i', j' \leq 1} \{u_{rm}(i + i' + \Sigma p_m, j + j' + \Sigma q_m)\} \quad (7)$$

Similar effects can be achieved by calculating the maximum of the directional plane value of the point in question and the neighbors thereof on the input planes before performing the processing. In this case, it is not necessary to consider a plurality of points during the processing.

(2) Directional fluctuations can also be absorbed by considering not only the rm component of the input planes U but also the rm±1 components when the addition to the counter plane C is carried out by the processing of procedure (2-2). This becomes possible by calculating the maximum among the adjacent directional planes shown in FIG. 1. The value wij can be calculated by the following equation.

$$w_{ij} = w_{ij} + \max\{u_{rm}(i + \Sigma p_m, j + \Sigma q_m), \quad (8)$$

-continued
$$u_{rm-1}(i + \Sigma p_m, j + \Sigma q_m), u_{rm+1}(i + \Sigma p_m, j + \Sigma q_m)\}$$

Similarly to the absorption of slight movement as described above in varation (1), the maximum can be calculated by comparing the input plane with other input planes before performing the processing.

(3) As the value to be added to the counter plane C, a value calculated from Urm can be used instead of Urm itself. For example, in equation (8), the weight coefficients for the (rm−1) and (rm+1) components could be set at ½ of that of the rm component. Thus, the values to be added would better express the normal directions at the evaluation points, thereby giving more accurate evaluation values of similarity.

(4) In the above embodiment, the template or the model is assumed to be a rigid body. Likewise, the above variations (1) and (2), which are designed to absorb slight movement, are suitable for absorbing slight movement of a rigid body template. In contrast with this, the idea of a flexible template is sometimes required. A flexible template flexibly changes its form within a certain range, and the optimum matching is calculated within the range. To accomplish this, the maximum value in the neighborhood of the window Wij is selected instead of the value wij at the window Wij, when the adding processing is performed. In this case, the value wij is calculated as follows.

$$w_{ij} = \max_{-1 \leq i', j' \leq 1} \{w_i + i', j + j'\} + u_{rm}(i + \Sigma p_m, j + \Sigma q_m) \quad (9)$$

The calculation is performed by a parallel operation: First, c(i, j) are shifted in the range of −1≦i', j'≦1, that is, in the range of 3×3; and second, the resultant values are added to Urm. This operation is expressed by the following.

$$C = \max_{-1 \leq i', j' \leq 1} C[i', j'] + U_{rm} \quad (10)$$

This makes it possible to change the form of the flexible model in the selection range on the counter plane C.

(5) In the above embodiment, the density of the inside of the model is assumed to be lower than that of the background. The density, however, may not always be constant. The density of the background may be irregular; or that of the model may not be constant. In such a case, the directions of the normal lines and the corresponding directions of the edges in the input image may change by 180 degrees, and in addition, the phenomenon may occur irregularly. To handle such a problem, the evaluation of the angle difference is performed not for every 360 degrees but for every 180 degrees. In this case, the value wij is expressed by the following equation.

$$w_{ij} = w_{ij} + \max\{u_{rm}(i + i' + \Sigma p_m, j + j' + \Sigma q_m), \quad (11)$$
$$u_{rm+4}(i + i' + \Sigma p_m, j + j' + \Sigma q_m)\}$$

To achieve a similar effect the adding processing can be performed with regard to integrated planes which have been produced in advance by ORing (i.e., by taking the maximum value of) the 0-th plane and the 4-th plane, the 1st plane and the 5-th plane, the 2nd plane and the 6-th plane, and the 3rd plane and the 7-th plane.

(6) In the above embodiment, 8 directional planes are used. The number of planes, however, can be increased to improve the directional accuracy. In this case, the adding processing is the same as that of the embodiment. On the other hand, extraction of the input planes can be effectively carried out by using a "twist type operation" which extracts the characteristics of given directions by using only 8 neighbor operations proposed by the inventors of the present invention. When the number of the directional planes is increased, an increasing number of discrepancies between the directions designated by the model and the directions appearing in the input images occurs. As a result, it is important to reduce the directional acuteness in measuring the distance of similarity described in (2).

(7) The input information can be expressed not only by respective directional planes but also by values $v(i, j)$ indicating the directions, for example, $0-2\pi$, and $u(i, j)$, representing the intensity of the directions. In this case, the directional planes can be expressed by the following equation.

$$U = (u(i, j), v(i, j)) \qquad (12)$$

Values to be added to the counter plane C can be determined from the directions rm of the model and the directional intensity u of the input. The values $w_{ij}$ in this case are expressed as follows.

$$w_{ij} = w_{ij} + u(i + \Sigma p_m, j + \Sigma q_m) \times \qquad (13)$$
$$d(r_m - v(i + \Sigma p_m, j + \Sigma q_m))$$

By this method, an infinitely high accuracy can be approached with regard to the directions of the model and input. Furthermore, it has the advantage that only one directional plane is sufficient. The parallel operation about respective points, however, becomes considerably complicated in the similarity distance calculation.

(8) As a more flexible expression of the characteristics, local templates h around the evaluation points of the model can be provided without changing the input image. Values to be added to the counter plane C are determined by convolution when the addition is performed. The values $w_{ij}$ in this case are expressed by the following equation.

$$w_{ij} = w_{ij} + \sum_{i'} \sum_{j'} \{h(i', j') \times u_{rm}(i + i' + \Sigma p_m, j + j' + \Sigma q_m)\} \qquad (14)$$

This makes it possible to designate any local forms defined by the local templates h in addition to the directional characteristics u from the density gradients. In addition, the convolution operation between the local templates and the directional characteristics can be easily performed by a parallel operation alone, which is an advantage over the input expression described in (7) above.

(9) In the above embodiment, the form specified by the model is extracted from the entire input plane. The region from which the form is to be extracted, however, may be restricted. In such a case, a counter plane corresponding to the subregion is prepared and the processing is with regard to that subregion alone. As a result, the processing can be carried out by a counter plane of smaller memory capacity.

(10) In the above embodiment, the position and evaluation value at which the optimum matching is achieved can be obtained by repeating the shifts and additions followed by calculation of the maximum value on the counter plane C. In so doing, it is assumed that there is only one form corresponding to that of the model in the input plane. In contrast with this, when a plurality of forms corresponding to the model exist in the input plane, maximal points, that is, points having greater evaluation values in comparison with the neighboring points thereof, are searched for instead of a single maximum value.

(11) In the above embodiment, the model is a closed region. The model, however, is not necessarily a closed contour as long as the directions are defined at points on the model. A tree, for example, can be used as a model.

(12) The window is sequentially moved in the method described in the above embodiment. This may be called a "tracing type" procedure. In a tracing type, procedure the model shift vector ($p_m$, $q_m$) is designated as the shift vector from the evaluation point $m-1$ to the evaluation point m. In contrast with this, the shift vector ($p_m$, $q_m$) can be designated by the shift vector from a reference point specified in the model to the evaluation point m. In this case, the following processing is performed in addition to the parallel shift of procedure (2-1) and addition of procedure (2—2).

$$C := C\{-p_m, -q_m\} \qquad (15)$$

More specifically, at the point when the processing procedure (2—2) is completed, the window $w_{ij}$ is moved from the initial point to the point $(i+p_m, j+q_m)$ on the input image. Therefore, the counter plane C after the addition is counter-moved by $(-p_m, -q_m)$ to its original reference point $(i, j)$, which is repeated. This method can be called a "voting type" procedure because all the evaluation results are always collected with respect to the reference point.

In this case, the final shift with regard to the m stage and the first shift with regard to the $(m+1)$ stage can be integrated into a vector $(-p_m+p_{m+1}, -q_m+q_{m+1})$ so that the shift is performed by the vector. Thus, the processing at each stage becomes identical to that of the "tracing type" procedure. The difference from the tracing type procedure is that the reference point which is calculated at the final stage can be selected at a desired point on the model.

According to the present invention, the form specified by the model can be extracted from the image information by superimposing the model and the input image information, in the form of directional characteristic elements of the form defined as directional planes, using parallel processing.

Information indicating the degree of similarity $c(i, j)$ when the reference point of the model is positioned on each point $(i, j)$ of the counter plane, which indicates the probability of the existence of the form of model R at each point, can be obtained.

The number of calculations can be reduced by expressing the model by characteristic elements. The similarity distance calculations can be simplified by introducing the directional planes; and the execution of parallel operations with regard to the input plane can be achieved. Thus, the method and apparatus of the present invention make it possible to quickly extract a form from the entire input image plane by matching.

The present invention can thus extract from the input image a given "form," specified as the relationship between the lines, at a high speed. This means that the present invention has broad application to the field of automatic recognition of images, such as characters drawn on a complicated background, types and positions of objects which are examined by robot vision, and various tissues and internal organs in medical images.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image recognition apparatus for recognizing an image by extracting a previously defined form from an input image composed of a plurality of image points each of which has image information, and to which predetermined multiple directions are assigned, said image recognition apparatus comprising:

model storing means for storing a model of said form, said model being expressed in terms of a sequence consisting of evaluation points defined on said form, each of said evaluation points having a value for a directional feature determined for the respective evaluation point and having a shift vector to said respective evaluation point from an evaluation point immediately preceding said respective evaluation point in said sequence;

directional plane generator means for generating a plurality of directional planes, each directional plane corresponding to a respective one of said multiple directions and including a plurality of directional plane points, each directional plane point corresponding to a respective one of said image points and having a respective directional intensity value which represents the change in the density of said input image in the one of said multiple directions that corresponds to the directional plane to which the respective directional plane point belongs;

directional plane storing means for storing said directional planes generated by said directional plane generator means;

counter plane storing means for storing a counter plane which includes a plurality of counter plane points each of which corresponds to a respective one of said image points, said counter plane points having counter values each of which represents a degree of similarity in form between said input image and said model;

shift means for shifting said counter plane stored in said counter plane storing means according to said shift vector defined for each evaluation point;

add means for adding, to said counter values of said counter plane shifted by said shift means, the directional intensity values of a directional plane determined by the value for the directional feature defined for the relevant evaluation point with regard to the shifting operation by said shift means;

control means for performing the shift operation by said shift means and the add operation by said add means repeatedly in the order of said evaluation points in said sequence; and detect means for determining the location of said form from the distribution of said counter values for said counter plane points of said counter plane storing means, after said shift operation and said add operation have been performed repeatedly.

2. An image recognition apparatus as claimed in claim 1, wherein each of the directional intensity values which are added by said add means add to said counter values is a maximum out of a value of each of said directional plane points and values of points adjacent to each of said directional plane points.

3. An image recognition apparatus as claimed in claim 1, wherein said add means adds to said counter values, a maximum out of directional intensity values of a particular directional plane for a direction as specified by said value for the directional feature and directional intensity values of the directional planes for adjacent directions in said multiple directions to the direction of said particular directional plane.

4. An image recognition apparatus as claimed in claim 1, wherein said add means adds to the counter values each of which is a maximum out of a counter value of each of said counter plane points and counter values of points adjacent to each of said counter plane points, said directional intensity values of said directional plane.

5. An image recognition apparatus as claimed in claim 1, wherein said add means adds to said counter values, a maximum value out of directional intensity values of a particular directional plane for a direction as specified by said value for the directional feature and the directional intensity values of the directional planes for the directions opposed to that of said particular directional plane.

6. An image recognition method for recognizing an image by extracting a previously defined form from an input image composed of a plurality of image points each of which has image information, and to which predetermined multiple directions are assigned, said image recognition apparatus comprising the steps of:

storing a model of said form, said model being expressed in terms of a sequence consisting of evaluation points defined on said form, each of said evaluation points defined on said form, each of said evaluation points having a value for a directional feature determined for the respective evaluation point and having a shift vector to said respective evaluation point from an evaluation point immediately preceding said respective evaluation point in said sequence;

generating directional planes, each directional plane corresponding to a respective one of said multiple directions and including a plurality of directional plane points, each directional plane point corresponding to a respective one of said image points and having a respective directional intensity value which represents the change in the density of said input image in the one of said multiple directions that corresponds to the directional plane to which the respective directional plane point belongs;

storing said directional planes;

storing a counter plane which includes a plurality of counter plane points each of which corresponds to a respective one of said image points, said counter plane points having counter values each of which represents a degree of similarity in form between said input image and said model;

shifting said stored counter plane according to said shift vector defined for each evaluation point;

adding to said counter values of said counter plane shifted by said shift means, the directional intensity values of a directional plane determined by the value for the directional feature defined for the relevant evaluation point with regard to the shifting operation by said shift means;

performing the shift operation and the add operation repeatedly in the order of said evaluation points in said sequence; and determining the location of said form from the distribution of said counter values for said stored counter plane points, after said shift operation and said add operation have been performed repeatedly.

7. An image recognition method as claimed in claim 6, wherein each of the directional intensity values which are added to said counter values is a maximum out of a value of each of said directional plane points and values of points adjacent to each of said directional plane points.

8. An image recognition method as claimed in claim 6, wherein a maximum out of directional intensity values of a particular directional plane for a direction as specified by said value for the directional feature and directional intensity values of the directional planes for adjacent directions in said multiple directions to the direction of said particular directional plane, is added to said counter value.

9. An image recognition method as claimed in claim 6, wherein said directional intensity values of said directional plane are added to the counter values each of which is a maximum out of a counter value of each of said counter plane points and counter values of points adjacent to each of said counter plane points.

10. An image recognition method as claimed in claim 6, wherein a maximum out of directional values of a particular directional plane for a direction as specified by said value for the directional feature and the directional intensity values of the directional planes for the directions opposed to that of said particular directional plane, is added to said counter value.

* * * * *